United States Patent [19]
Buffington

[11] 3,774,780
[45] Nov. 27, 1973

[54] PORTABLE PIPE PICK-UP, CONVEYING AND RACKING DEVICE

[76] Inventor: William B. Buffington, Odessa, Tex.
[22] Filed: Sept. 7, 1972
[21] Appl. No.: 287,110

[52] U.S. Cl. .................. 214/2.5, 104/112, 214/1 P
[51] Int. Cl. ........................................... E21b 19/14
[58] Field of Search ..................... 214/1 P, 2.5, 3.1, 214/DIG. 3; 212/72; 104/112, 114; 175/85

[56] References Cited
UNITED STATES PATENTS

| | | | |
|---|---|---|---|
| 890,306 | 6/1908 | Schmertz | 214/2.5 X |
| 2,601,585 | 6/1952 | Bateman | 212/72 |
| 2,900,091 | 8/1959 | Minter | 214/2.5 |
| 3,532,229 | 10/1970 | Scaggs | 214/2.5 |

FOREIGN PATENTS OR APPLICATIONS

142,575  12/1961  U.S.S.R. .............................. 214/1 P

*Primary Examiner*—Gerald M. Forlenza
*Assistant Examiner*—Frank E. Werner
*Attorney*—Wayland D. Keith

[57] ABSTRACT

A device and system for picking up pipe, which is arranged horizontally on a rack, putting the pipe in position to be run into the bore hole of a well, removing the pipe from the bore hole of the well and conveying it to a position to be returned to a horizontally racked position. The device utilizes a hydraulic elevating mechanism to move the pipe into position, to be moved by a cable supported and cable actuated power conveyor, to be picked up while horizontally arranged on a rack, and conveyed semi-automatically to a position adjacent the drilling rig to enable pipe elevators to be attached to the pipe for suspending the pipe in a derrick to be attached to the length of the pipe therebelow to be run into the bore hole of the well, and to be removed from the bore hole of the well, whereupon the pipe is directed onto a trolley for movement down a cable supported and cable actuated power conveyor, to be discharged horizontally from the conveyor onto a pipe rack. A modified form of the invention, for use with a wheeled carrier on a track, enables the pipe to be moved the length of the supporting trackway.

15 Claims, 19 Drawing Figures

PORTABLE PIPE PICK-UP, CONVEYING AND RACKING DEVICE

BACKGROUND OF THE INVENTION

Various devices have been proposed heretofore for conveying drill pipe to the drilling rig for running the pipe into the bore hole of a well, conveying the drill pipe from the rig, when it is removed from the bore hole, while the drilling operation is proceeding, however, the present invention is designed primarily to enable long strings of drill pipe, usually several thousand feet, to be removed from the bore hole of a well, when it has become worn and unsafe, and new or unworn pipe of similar footage to be conveyed to the derrick for insertion into the bore hole of the well.

SUMMARY OF THE INVENTION

An object of this invention is to provide a pipe conveying device and system by which to convey several thousand feet of drill pipe from a horizontal position to a position accessible to the derrick floor, thereby enabling the pipe to be picked up and suspended in the derrick, preparatory to being run into the bore hole of the well, in an expedient manner.

Another object of the invention is to provide a cable supported, power driven trolley system for conveying pipe from a horizontal position on a rack to the derrick floor of a drilling rig and for conveying the pipe from the derrick floor of the drilling rig to a rack for racking the pipe horizontally.

Still another object of the invention is to provide a portable, power driven, cable supported trolley system for conveying pipe from a horizontal position on a rack to the derrick floor of a drilling rig, and conveying the pipe from the derrick floor of the drilling rig to a rack for racking the pipe horizontally.

Yet a further object of the invention is to provide a portable, power driven, cable supported trolley system for conveying pipe from a horizontal position on a rack to the platform of a derrick and to convey the pipe from the derrick platform to a pipe rack for racking the pipe horizontally.

Still a further object of the invention is to provide a portable, power driven pipe elevating and conveying system for picking up pipe which is horizontally positioned on a pipe rack, elevating the pipe by a power driven cable so as to be in close proximity to a support cable, then conveying the length of pipe to a derrick platform.

Yet another object of the invention is to provide a portable, power driven pipe elevating and conveying system, using the same cable system for conveying the pipe and for picking up the pipe.

Still another object of the invention is to provide a portable, power driven, cable supported and cable conveying system which will semi-automatically operate to pick up, elevate and convey a length of pipe from a horizontal position on a pipe rack to a derrick floor.

Yet a further object of the invention is to provide a fluid pressure actuated elevating system for elevating pipe from a storage rack to a rack for loading the pipe onto a conveyor for conveying the pipe to a derrick platform.

Still a further object of the invention is to provide a portable, power driven, semi-automatic pipe elevating and conveying system for conveying horizontally racked pipe to the derrick floor for running into the bore hole of a well and for conveying the pipe from the derrick platform to a rack to be racked horizontally, which system is simple in construction, easy to operate and relatively low in cost for the operations performed.

DESCRIPTION OF THE DRAWINGS

With these objects in mind and others which will become manifest as the description proceeds, reference is to be had to the accompanying drawings in which like reference characters designate like parts in the several views thereof, in which.

With more detailed reference to the drawings, the numeral 1 designates generally the derrick or mast of a drilling rig, which has an elevated platform 2 through which a length of pipe 4 extends to form a "mouse hole" casing. The numeral 6 designates a truck, which truck has winching mechanism 8 thereon, together with the controls therefor. The winching mechanism 8 may be driven by an independent prime mover 10 or by the motor of the truck 6.

Figures 1, 3, 4:
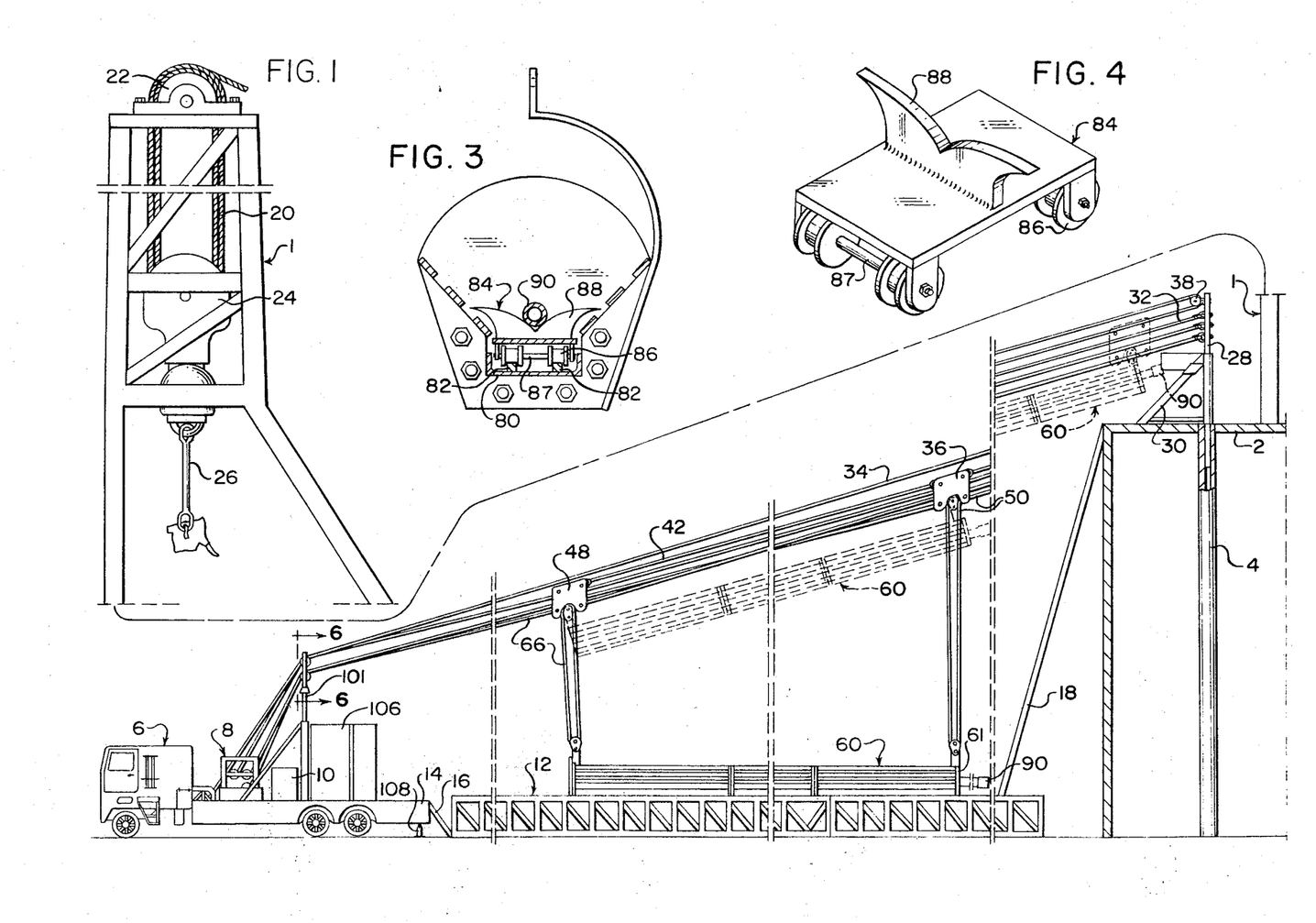
FIG. 1 is a side elevationsl view, with parts broken away and with parts shortened, and with parts removed, and with parts transposed for clearness, of a pipe handling and conveying system to convey pipe from a horizontal rack to a position adjacent the derrick floor to enable the pipe to be picked up, preparatory to being run into the bore hole of a well, alternating positions being shown in dashed outline.
FIG. 3 is a sectional view taken on the line 3—3 of FIG. 2, looking in the direction indicated by the arrows.
FIG. 4 is a perspective view of a wheeled pipe carrier.

A pipe loading and unloading rack 12 is provided intermediate the end of body 14 of truck 6 and the elevated platform 2 and is braced by an angulated brace 16, with a brace 18 extending between the loading and unloading rack 12 and the elevating platform 2, as will best be seen in FIG. 1.

The derrick 1 has cables 20 extending downward from the crown block 22 thereof to support a traveling block 24 therebelow. Pipe elevators 26 are attached to the traveling block 24, which traveling block is raised and lowered by a hoisting mechanism (not shown).

An upstanding post-like member 28 extends into pipe 4 and extends thereabove and is braced by an angulated brace 30 between the elevated platform 2 and the upstanding post-like member 28 to which post 28 is anchored. A trolley 36, having sheaves 35 journaled thereon, is mounted for movement along a support cable 32. A trolley conveyor cable 34, one end of which cable 34 passes through sheave 38 mounted on the post-like member 28 near the upper end thereof, has the distal end thereof attached to an eye 40 on the upper side of the upper trolley 36. A spacer cable 42 is anchored to an eye 44 on the opposite side of trolley 36 and extends downwardly to be anchored to an eye 46 on the upper side of trolley 48. The spacer cable 42 normally holds trolleys 36 and 48 a spaced distance apart. The trolley 48 has sheaves 49 journaled therein, FIG. 2, which sheaves move along trolley support cable 32 upon movement of trolley conveyor cables 34 and 42. Since the trolley support cable 32 is on an incline, the trolleys will be pulled upwardly therealong by trolley conveyor cable 34, upon release of tension on trolley conveyor cable 34, the trolleys 36 and 48 will move downwardly along the inclined cable 32, together with pipe carrier 60.

A cable 50 is anchored to upright, post-like member 28 and extends downward over sheaves 52 and 54 on trolley 36 and beneath sheave 56 on the pipe carrier 60 by a pivot pin 59 to support the upper end of pipe carrier 60. The cable 50 extends through trolley 48 between spaced apart pairs of rollers, which rollers are similar to the spaced apart pairs of rollers 62 and 64, as shown on trolley 36, FIG. 2. A cable 66, similar to cable 50, is anchored to the upright post-like member 28 and extends downward through trolley 36 between pairs of rollers 62 and 64, in guided relation and over sheaves 68 and 70 and beneath a sheave 72, which sheave is mounted in a frame 67, which frame is pivotally connected to a upstanding arm 74 by a pivot pin 69 to support the lower end of the pipe carrier 60.

Figures 2, 5, 6:
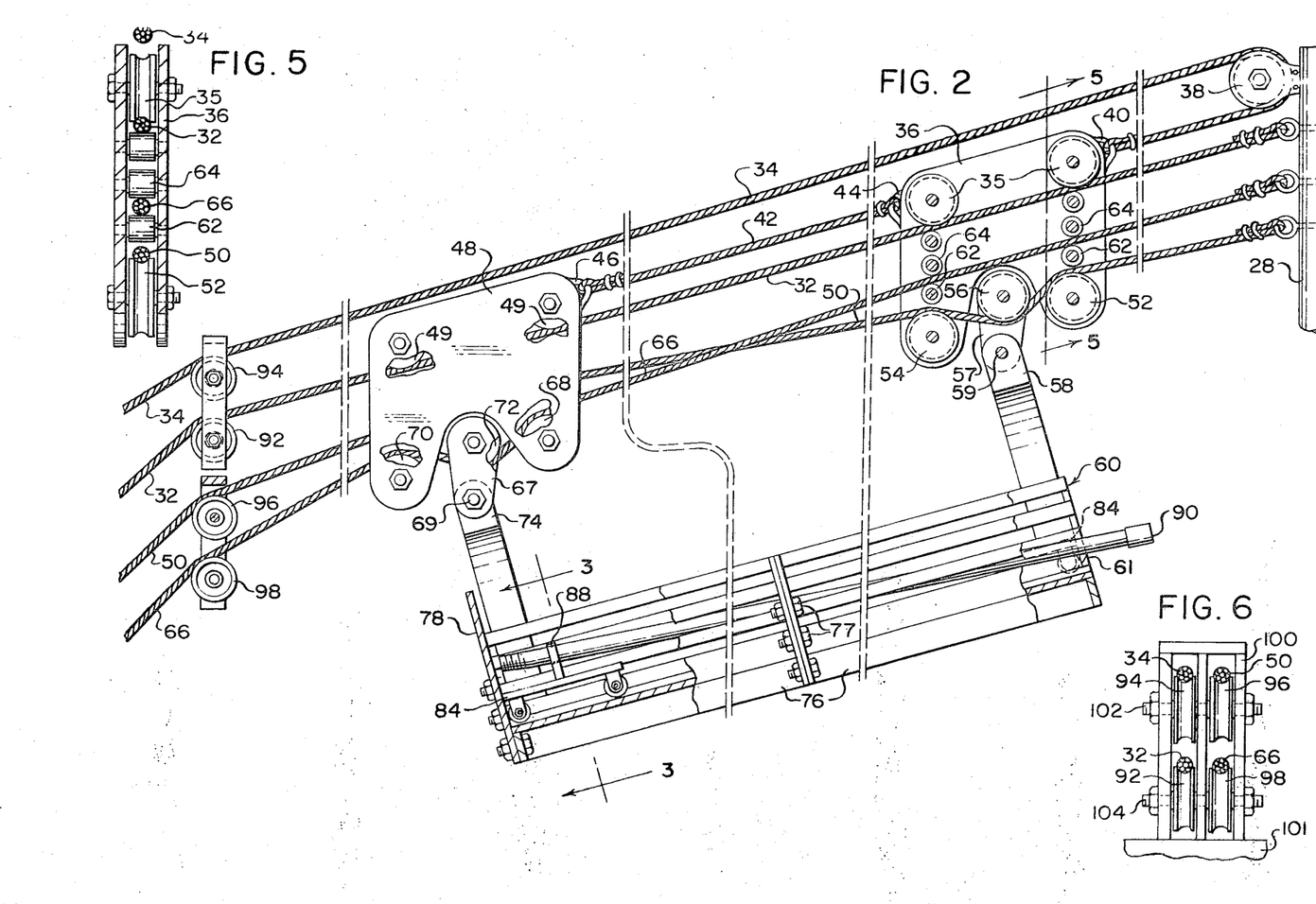
FIG. 2 is an enlarged, fragmentary, side elevational view, with parts broken away and with parts shortened and parts shown in elevation and parts being shown in section, of a cable supported pipe elevating and trolley system, showing an anchor post therefor.
FIG. 5 is a sectional view, take on the line 5—5 of FIG. 2, looking in the direction indicated by the arrows.
FIG. 6 is a sectional view taken on the line 6—6 of FIG. 1, looking in the direction indicated by the arrows.

The pipe carrier 60, as shown in FIGS. 1, 2 and 3, is preferably trough-like and is made of sections 76 which are bolted together by bolt 77, FIGS. 1 and 2, with an end 78 bolted in place on the lower end thereof to restrain the downward movement of the wheeled car. The pipe carrier 60 is provided with a channel member 80 on the lower side thereof on which trackways 82 are mounted to receive the wheeled car 84 thereon, which car has flanged wheels 86 journaled on shafts 87 thereon for operation on trackway 82. The car 84 preferably has an upstanding, V-shaped member 88 thereon to receive pipe 90 to be conveyed along the length of pipe carrier 60. The upper end 61 of pipe carrier 60 is magnetized, so the car 84, which is magnetically attractable, will remain in the position, as shown in dashed outline, at the upper end of the carrier 60, FIG. 2, until a pipe is loaded thereonto or the car 84 is otherwise dislodged from the magnetized end 61.

The tautness of cables 32, 34, 50 and 66 is controlled by individual winches on the winching mechanism 8. The cables 32, 34, 50 and 66 pass off of winches on the winching mechanism 8 and over sheaves 92, 94, 96 and 98, FIGS. 1, 2 and 6, which sheaves are journaled on an upstanding frame 100 mounted on upright support member 101 on truck body 14. Shafts 102 and 104 journal sheaves 94 and 96 and 92 and 98, respectively, as will best be seen in FIG. 6. However, for the sake of clearness, these sheaves are shown in exploded, elevational relation in FIG. 2.

The pipe handling system, as shown in FIGS. 1, 2, 5 and 6, is adaptable for use with other types of pipe carriers, such as shown in FIGS. 7 through 10, without altering the trolley support cable 32, the trolleys 36 and 48 or the trolley elevating cables 50 and 66.

OPERATION OF FIRST FORM OF INVENTION

The invention is used in connection with a truck which has the prime mover mounted thereon, or the truck engine is used as the prime mover in performing the various operations. The present device is designed to handle lengths of pipe expeditiously, from the pipe which is horizontally racked, substantially at ground level, to the derrick platform or from the derrick platform to the rack for racking the pipe horizontally. The truck 6 is stabilized a spaced distance from the derrick platform 2 and has a loading rack 12, which rack 12 is preferably elevated above the horizontal pipe rack, and is positioned intermediate the truck 6 and the derrick platform 2 and has a brace 18 between the pipe loading and unloading rack 12 and the derrick platform 2, so as to make a composite unit, with the upright post-like member 28 in place, and having the cables 32, 34, 50 and 66 anchored thereto. The cables pass over sheaves 92, 94, 96 and 98 to be wound on individual winches on the winching mechanism 8 of the truck, with the support cable 32 being angulated between the upright support member 28 and the upright support member 101 on the truck body 14. Pipe may be racked horizontally on each side of pipe loading and unloading rack 12 at a lower elevation on storage racks 324 and 326 and elevated therefrom by fluid actuated jacks, onto the loading and unloading rack 12, as will be more fully brought out hereinafter.

With the pipe 90 on the loading rack 12, the pipe is moved onto the pipe carrier 60 so that the end thereof, adjacent the derrick, will extend outward therefrom, as shown in FIGS. 1 and 2. The pipe carrier 60 will be in the position as shown in full outline in FIG. 1, while the pipe is being moved thereonto, as will be more fully brought out hereinafter. With the pipe 90 within the pipe carrier 60, as shown in full outline, winches are utilized to tighten cables 50 and 66, until sheaves 56 and 72 are moved upward into the notched portions of the respective elevators 36 and 48, as shown in full outline in FIG. 2, and also shown in dashed outline FIG. 1, in a first position.

In loading the pipe 90 onto the pipe carrier 60, the pipe is loaded onto a wheeled car 84 so the lower end thereof will rest on an upstanding, V-shaped member 88, as will best be seen in FIGS. 2 and 3. The end of the pipe 90 toward the derrick 1 will extend from the pipe carrier, whereupon, a trolley conveyor cable 34 will be wound onto one of the winches on winch mechanism 8, which will cause trolley 36 and trolley 48, conntected thereto, to move along the support cable 32 in the elevated position until the pipe carrier 60 moves to the position indicated, by the upper-most dashed outline, FIG. 1, whereupon, an elevator, catline or the like is used to pick up a pipe 90 for depositing this with a string of pipe being run into the bore hole of the well. Upon picking up the upper end of pipe 90, the wheeled car 84, which car if of magnetically attractable material, will be held thereto by magnetic attraction until it is manually or otherwise moved away. The trolleys 36 and 48 are returned to the desired location on support cable 32 and the elevating cables 50 and 66 are slackened, which will permit the pipe carrier 60 to move from the position shown in dashed outline over the pipe loading and unloading rack, to the full outline position, and the wheeled car 84 is moved against end member 78 and the proceedure is repeated until the desired number of lengths of pipe is conveyed to the platform 2 of the derrick 1. When it is desired to remove the pipe from the well and lay it down, frequently as much as 20 to 30 thousand feet of pipe, such as drill pipe, the wheeled car 84 is moved along trackway 82 until it abuts with the magnetized end plate or module 61 while the pipe carrier 60 is on the pipe loading and unloading rack 12, as shown in full outline. Whereupon, the pipe carrier elevating cables 50 and 66 are tightened to move the pipe carrier 60 from the position shown in full outline in FIG. 1 to that shown in dashed outline therein directly above the pipe loading and unloading rack 12. Upon tightening the conveyor cables 34, the trolleys 36 and 48 will be moved upwardly along the inclined support cable 32 until the upper end of the pipe carrier is adjacent the derrick platform 2. The end of the pipe 90 is then placed on the wheeled car 84 which is being held in magnetically attracted relation to the end member or magnetic module 61, then, by maintaining the pipe carrier 60 in stationary angulated relation, as shown in FIG. 1, the wheeled car 84 moves along the trackway 82 until the wheeled car 84 abuts with the end member 78.

The aforedescribed operation is reversed by slackening the tension on trolley conveyor cable 34, which will permit trolleys 36 and 48 to move to the desired position above the pipe loading and unloading rack 12, whereupon, the cables 50 and 66 are slackened to move the pipe carrier 60 to the position shown in full outline in FIG. 1. The pipe carrier 60 may then be tipped sidewise to enable the pipe to roll from the pipe carrier 60 onto unloading rack 12 and thence onto a storage rack for racking the pipe horizontally, as will be brought out more fully hereinafter.

This action is repeated until the pipe is removed from the well. When the operation of removing the pipe is complete, the cables are slackened and upright postlike member 28 is removed from the "mouse hole" pipe 4, together with the angulated brace 30 and the cables, as a unit, and the cables are wound onto the winches of the winch mechanism 8, and the upright, post-like member 28 together with the trolleys and sheaves, which still have the various cables therethrough, are placed in a compartment 106 for transportation to another location. Jacks 108 are provided on each side of the body 14 of truck 6 to maintain the truck body in stable position while in operation. The jacks are removed for transportation from one location to another. The pipe loading rack 12 is sectionalized to enable it to be disassembled for hauling. The angulated braces 16 and 18 are removed and the entire unit may be readily moved and reassembled at another location in a minimum of time.

SECOND AND PREFERRED FORM OF THE INVENTION

The second form of the invention is used in connection with the trolley and cable system, shown for the first form of the invention. The cables 50 and 66 pass around sheaves 56 and 72 respectively, which sheaves are journaled on shafts in the respective frames 57 and 67. The frames 57 and 67 each has a clevis 200 and 201, which pivotally connect to the respective sheave frames 57 and 67. The clevis 200 has a pin therethrough and the clevis 201 has a pin therethrough, which pins 202 and 204 pass through holes 206 and 208 in the respective support hooks 210 and 212, at each end of the modified carrier, designated generally at 214. The pipe carrier 214 is semi-cylindrical in shape and is comprised of a plurality of sections 215, which are joined together by flanges 216 to provide a pipe carrier of the desired length. An end plate 218 and support hooks 210 and 212 have axially aligned holes 220 to receive pin 222 therethrough, which pin passes through holes in lugs 224 on end plate 218. A cotter key 226 passes through pin 222 to prevent the pin 222 moving longitudinally outward. A reinforcing plate 228 is secured over one of the holes 220, to prevent longitudinal movement of the pin 222 in the direction of plate 228. Reinforcing members 230 are provided between the legs of the angulated hook members 210 and 212. The end plate 218 may be fitted either in hook 210 or in the hook 212, by removing the pin 222 and inserting the pin through the lugs 224 and holes 220. In this manner the pipe carrier 214 may be made to load or unload from either end or reversed from side to side for receiving pipe from either side of the pipe loading and unloading rack 12, as will be more fully brought out hereinafter.

The particular hooks 210 and 212 are designed for semiautomatic loading and unloading of pipe from a pipe rack.

OPERATION

The form of pipe carrier shown in FIGS. 7 through 10 has semi-cylindrical receiving portions 215, which are flanged, as indicated at 216 and bolted together by means of bolts 217 to give a pipe carrier of the desired length. The handling of this form of pipe carrier utilizes the same cable system as that utulized by the first form of the invention, but it does not require a wheeled car to enable the pipe to be unloaded into the derrick 1 when it is conveyed to the derrick platform 2, but as the pipe 90 is hoisted into the derrick, the distal end from the catline or pipe elevators drags along the rounded portion of the carrier without material injury to the threads of the pipe 90. The same is true when the pipe is being taken out of the well and loaded onto the carrier 214 to be conveyed to the loading and unloading rack 12. However, the present pipe carrier uses equipment in combination therewith which enables the loading and unloading of the pipe to be semi-automatic in character, as will be more fully brought out hereinafter.

THIRD FORM OF INVENTION

Figures 7, 8, 18:
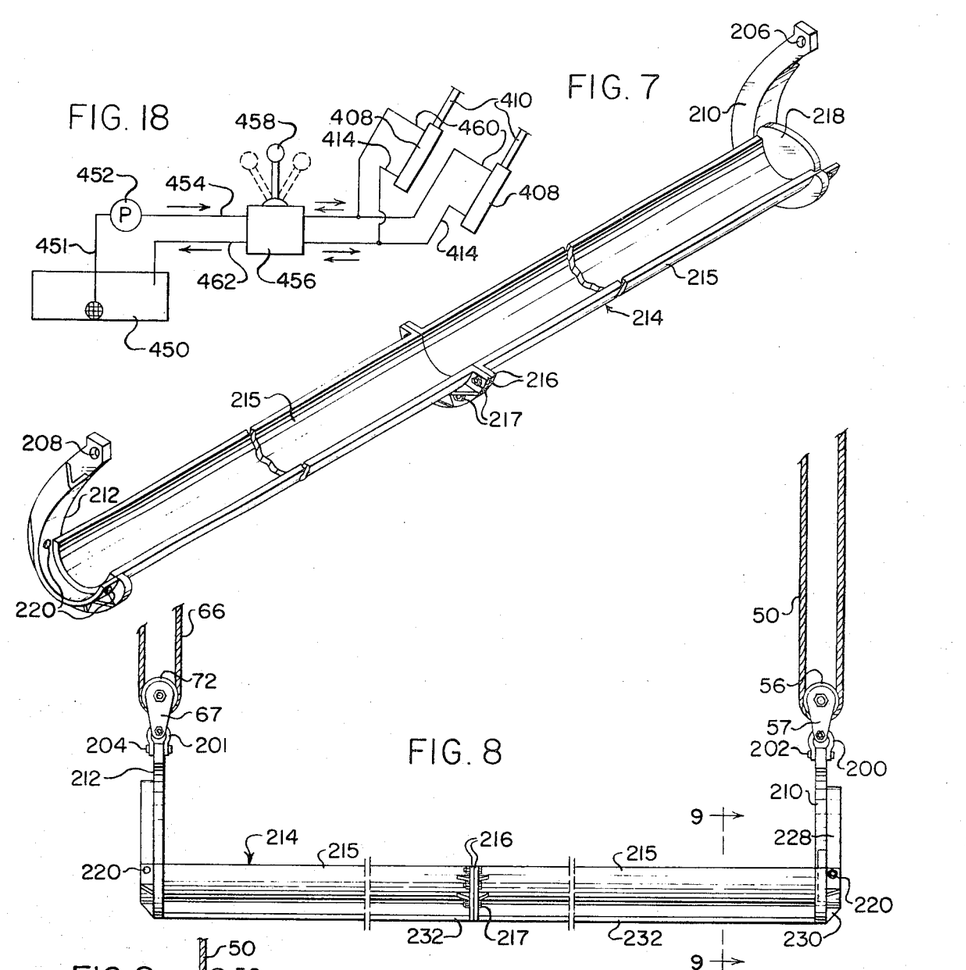
FIG. 7 is a perspective view of a modified pipe carrier, which is the preferred form, shown apart from the rest of the structure.
FIG. 8 is a side elevational view of the pipe carrier, showing sheaves and supporting cable attached thereto for use in place of the pipe carrier as shown in FIGS. 1, 2, 3, and 4.
FIG. 18 is a diagrammatic view of the fluid pressure actuated control system for controlling the various functions of the pipe elevating and conveying device.
Figure 9:
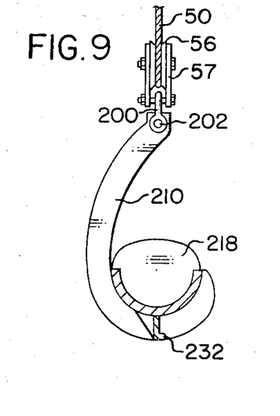
FIG. 9 is a slightly enlarged view taken on the line 9—9 of FIG. 8, looking in the direction indicated by the arrows, to show the construction thereof.
Figure 10:
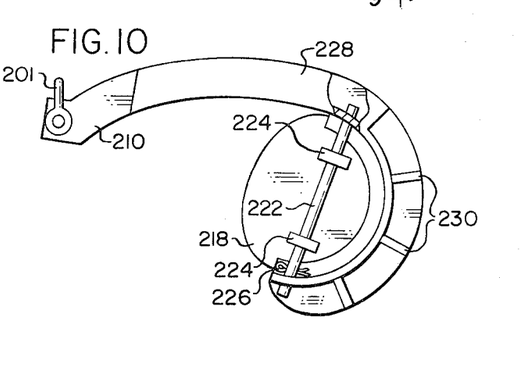
FIG. 10 is an enlarged end view of the pipe carrier shown in FIG. 7, but showing the pipe carrier in position to discharge pipe, with parts broken away and with parts shown in section.
Figures 11, 11A, 12, 13, 14:
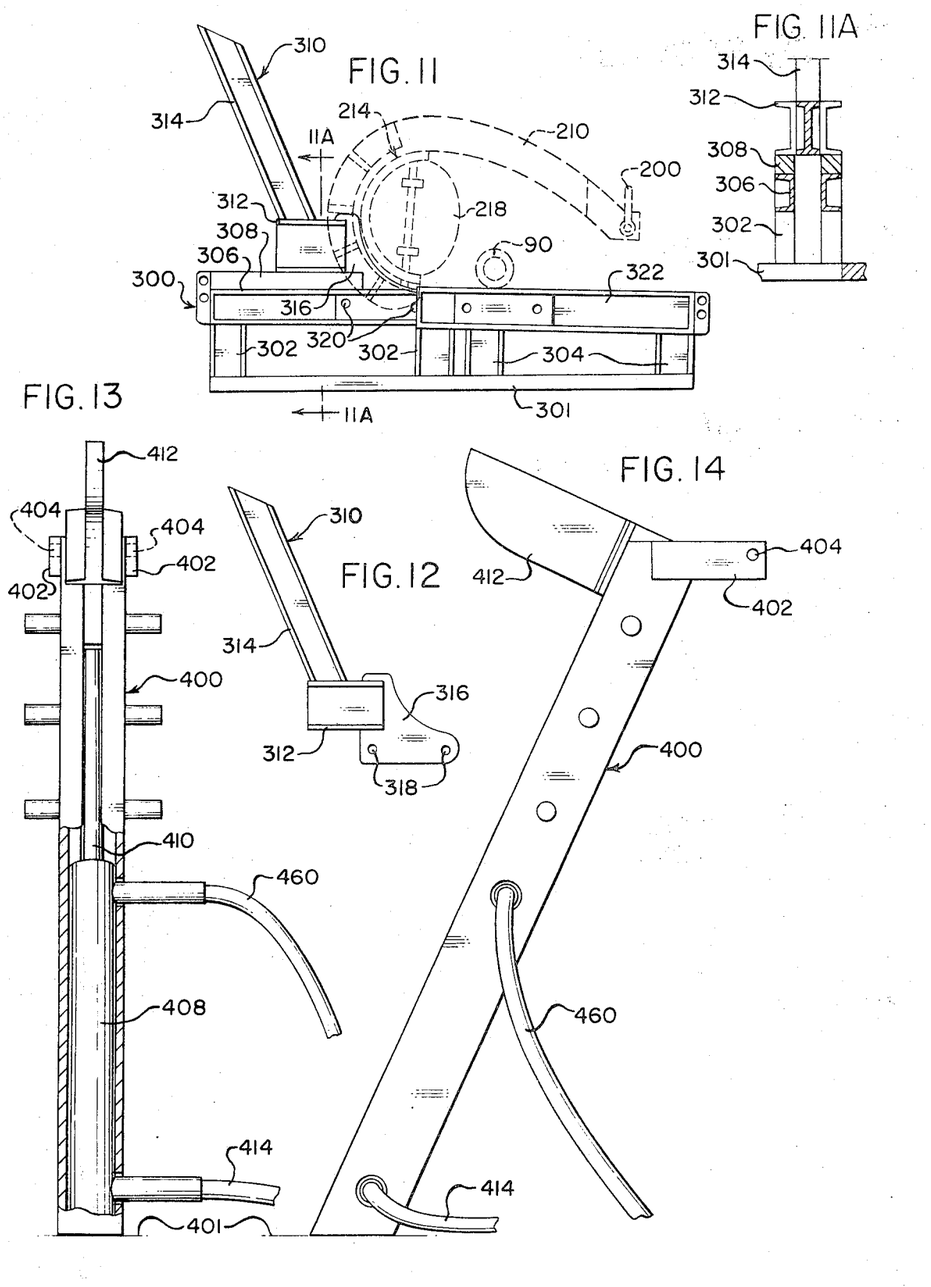
FIG. 11 is a side elevational view, in full outline, of the pipe racking stand, showing the pipe carrier and pipe being discharged therefrom, in dashed outline.
FIG. 11A is a sectional view taken on the line 11A—11A of FIG. 11, looking in the direction indicated by the arrows, with parts broken away to bring out the details of construction.
FIG. 12 is a side elevational view of a member of the unloading device, as shown in FIG. 11.
FIG. 13 is a side elevational view of a fluid actuated device for elevating pipe from a storage rack to a rack to receive pipe to be conveyed to the derrick floor.
FIG. 14 is an elevational view taken at right angles to FIG. 13, of the fluid actuated pipe elevating device.

A third form of the invention is utilized with the second form of pipe carrier 214, to expedite unloading pipe from the pipe carrier as the pipe is being removed from the well, and is illustrated in detail in FIGS. 11, 11A and 12, which FIGS. disclose a device, designated generally at 300, for unloading the pipe 90 from the pipe carrier 214 as the pipe is removed from the bore hole of the well, and the device embodies a base 301 which has upright standards 302 and 304 thereon, with the upright standards 302 supporting a pair of spaced apart, elevated, horizontal beams 306. Each of the beams 306 has an elevated bar 308 on the upper face thereof, which bar is adapted to receive a pipe carrier tipping device, which device is indicated by the numeral 310. The tipping device 310 has spaced apart channel members 312 secured to the lower end of an angulated structural member 314. An anchor plate 316 is secured between channel members 312, which anchor plate has a pair of spaced apart holes 318 formed in the lower side thereof to receive pins 320 therethrough to hold the pipe carrier tipping device 310 rigidly in position on bars 308, as shown in FIG. 11. When the pipe carrier 214 is lowered by cables 50 and 66, as shown in FIG. 8, the hooklike members 210 and 212 will engage the upper angulated face of structural member 314, which will move the hook like members from the position shown in FIGS. 7, 8 and 9 to the position shown in dashed outline, FIG. 11, whereupon, the pipe 90, such as drill pipe, will be rolled out of the semi-cylindrical carrier 215 onto a structural member 322, supported by upright standards 304 secured to the rack 12, which structural member is even with or below the outer lip of the semi-cylindrical carrier 215. The structural member 322 slopes outwardly and downwardly so as to roll the pipe 90 along the member 322 and onto a selected rack 324 or 326, depending upon the side of the rack 12 from which the pipe is to be diverted. As the pipe unloading device, as shown in FIG. 11, may be picked up and reversed end for end to divert pipe being unloaded to the other of the racks 324 or 326, by making certain changes in the mounting of the pipe carrier 214, as will be more fully brought out hereinafter. As the hooklike members 210 and 212 move downward along the face of pipe carrier tipping device 310, the hooklike members will engage the shoulder of the respective spaced apart channel members 312, which till tip the hooklike members 210 and 212 so that the semi-cylindrical portion of the carrier 214 will fit onto the curved portion of anchor plate 316 to insure the proper discharge of pipe 90 onto the downwardly sloping structural members 322, as will best be seen in FIG. 11.

In order to unload the pipe on the reverse side of the unloading and loading rack 12, the pipe unloading device 300 will be changed end for end, and by removing clevises 200 and 201, the hooklike members 210 and 212 are disconnected from the pulley mounting plates 57 and 67, whereupon, the semi-cylindrical pipe carrier 214 is also changed end for end and the clevises 200 and 201 are utilized to reconnect the hooklike members 210 and 212 to the semi-cylindrical pipe carrier 214. The pin 222 is removed from the semi-cylindrical pipe carrier 214, which enables the removal of the end plates 218. The plate 218 is removed from one end and changed to the opposite end, which enables the pipe being carried by the semi-cylindrical pipe carrier 214 to be discharged from the opposite side thereof onto a pipe storage rack, such as 324 or 236.

The proceedure of discharging pipe from the semi-cylindrical pipe carrier 214 to the opposite side of the pipe loading and unloading rack 12 is the same as has been set out hereinbefore.

FOURTH FORM OF THE INVENTION

Figures 15, 16, 17:
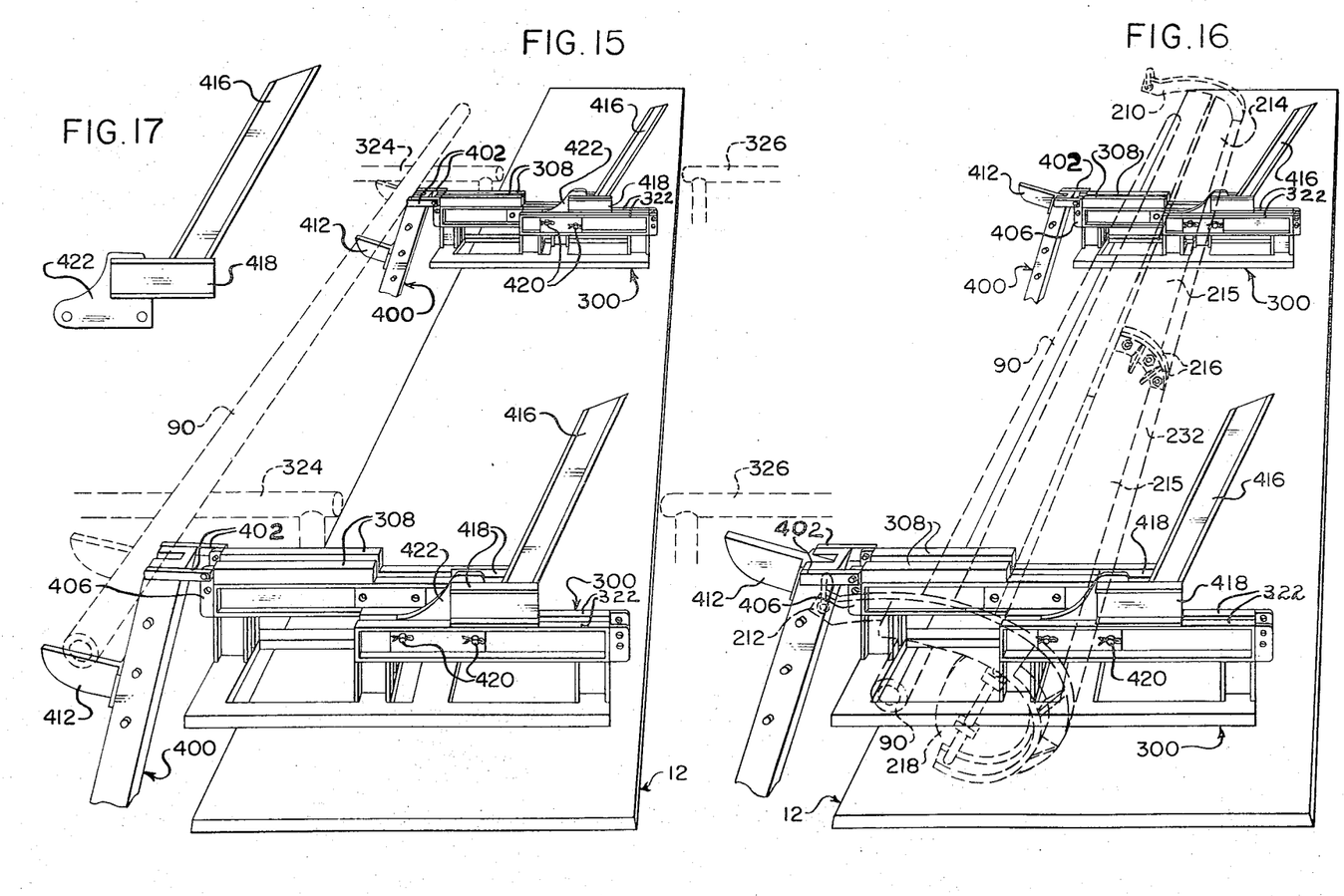
FIG. 15 is a perspective view of the device for elevating pipe from a storage rack to a rack to enable the pipe carrier to pick up the pipe and convey it to the derrick floor, with the storage pipe rack, a length of pipe being elevated, and a portion of the elevating jacks being shown in dashed outline to show the manner of operation of the fluid pressure actuated pipe elevating device.
FIG. 16 is a perspective view, similar to FIG. 15, but showing a portion of the fluid actuated jacks in the uppermost position, in full outline, and showing a length of pipe on the pipe elevating rack preparatory to being received by the pipe carrier and lengths of pipe are shown positioned thereon in dashed outline.
FIG. 17 is a side elevational view of an upstanding member shown apart from the pipe receiving and loading rack.

The fourth form of the invention is shown in FIGS. 13 through 18, and utilizes upright angulated members which are designated generally at 400, the lower ends of which members 400 are adapted to seat on the ground or on a base 401, with a lug 402 on the upper end thereof, which lug is apertured as indicated at 404 to enable the lug to be secured to apertured lugs 406, as will best be seen in FIGS. 15 and 16. The lugs 402 are secured to the angulated members 400, as by welding, and are preferably in the form of a structural member with an open throat therein to receive a fluid actuated cylinder 408, as will best be seen in FIG. 13. The cylinder 408 has a piston rod or plunger 410 therein, which plunger has an outstanding projection 412 on the upper end thereof, the upper face of which projection is angulated, as will best be seen in FIGS. 14, 15 and 16, so when in the position as shown in FIG. 16, the pipe 90 will roll inward against angulated member 400, and upon action of the plunger 410, fluid under pressure will be directed into conduit 414 and the pipe 90 is elevated from the position as shown in full outline in FIG. 15 to that shown in dashed outline FIG. 16. The pipe 90 will then roll along the face of bars 308, and with the semi-cylindrical pipe carrier 214 in the position as shown in dashed outline, FIG. 16, the pipe 90 will roll into the semicylindrical members 215, and, upon lifting the pipe carrier with cables 50 and 66, as shown in FIG. 8, the pipe is conveyed to the drilling platform 2 in the same manner as set forth in the first and second forms of the invention.

With the bars 308 in an elevated position above channel members 322, and with the second pair of pipe tipping devices 416, which are similar in construction to pipe tipping device 310, the angulated bars with the hooklike members 210 and 212, slide down the angulated face thereof and will come to rest in the position shown in FIG. 16, in dashed outline, with the open face of the semicylindrical carrier 214 adjacent the ends of the bars 308, the pipe 90 will roll thereonto, when in this position, and with the plate 218 secured to one end of the semi-cylindrical member 215, and with the cables 50 and 66, as shown in FIGS. 1 and 8, connected thereto, the pipe is hoisted and moved to the derrick platform 2, and will be removed from the semicylindrical pipe carrier 214 in the manner as set out for the forms of the invention illustrated in FIGS. 7, 8, 9 and 10. The angulated members 416 are secured between a pair of structural members 418 which seat on the upper face of structural members 322, and with the pins 420 positioned therethrough and through plate 422, the angulated members 416 are held securely in place, and with the curved plate 422 secured thereto, the hooklike members 210 and 212 and the semicylindrical pipe carrier 214 will automatically come to rest in the position as shown in FIG. 16, each time it is lowered into place by cables 50 and 66.

When it is desired to utilize the pipe unloading device 300 as a pipe loading device and with the angulated members 416 in place thereon, the pipe loading and unloading device 300, as shown in FIG. 15, is in position to load pipe from pipe storage rack 324 until the desired amount of pipe is transferred from the pipe storage rack 324 onto the pipe carrier device 214 in the manner as hereinbefore set out, by changing ends with the pipe loading and unloading device 300 and with the upright angulated members 400 moved to the opposite side, pipe may be elevated from the pipe storage rack 326 onto bars 308, and with the pipe carrier 214 in the position as shown in dashed outline, FIG. 16, but in reverse position and with the end plates 218 secured in place by pin 222, the pipe 90 may be moved from the pipe storage rack 326 into the pipe carrier, without manual effort, and the pipe taken to the derrick platform 2 in the manner hereinbefore described.

FLUID PRESSURE ACTUATED PIPE ELEVATING SYSTEM

The fluid actuated system for elevating the pipe may be pneumatic or hydraulic, however, for purpose of illustration, a hydraulic system is shown, which has a reservoir 450 with a pipe 451 extending thereinto, wherein a pump 452 withdraws hydraulic fluid through pipe 451 from the reservoir 450. The fluid is directed outward into conduit 454 which leads to four-way switching valve 456, which valve may be manually operated by a control lever 458, to direct hydraulic fluid outward through pipes 414 into the lower ends of hydraulic cylinders 408, with the hydraulic fluid therein flowing out through conduits 460 and returning through four-way control valve 456 to be discharged through pipe 462 into reservoir 450, which completes the cycle to cause plungers 410 to move out to lift the pipe 90 onto outstanding projections 421. After the pipe has been moved to the upper end of angulated members 400, the pipe 90 will roll onto the bars 308, and by moving the valve lever 458 to another position, hydraulic fluid will be directed to the upper end of the cylinders 408 through conduits 460 and discharge out through the lower end of cylinders 408 into pipes 414 to return, through manually operated four-way valve 456, to be discharged through conduit 462 into reservoir 450. Whereupon, the cycle is repeated until the pipe is transferred from the storage rack to the loading device 300. The lever 458 of valve 456 is shown in full outline in the blocking position, whereby the plungers 410 will be held against movement in either direction. However, when in one of the positions, as shown in dashed outline in FIG. 18, the plungers are moved outwardly, and when in the other position as shown in dashed outline, the plungers 410 will move inwardly.

What is claimed is:

1. A device for picking up pipe from a rack and conveying the pipe to a derrick platform, and for conveying pipe from the derrick platform to a pipe rack, which device comprises;
   a. a first upright member and a second upright member which upright members are spaced apart,
   b. a first cable extending between said first upright member and said second upright member and being fixedly secured to said first upright member,
   c. a first wheeled trolley and a second wheeled trolley mounted on said first cable for movement longitudinally therealong,
   d. a second cable interconnecting said trolleys for maintaining said trolleys in spaced apart relation,
   e. a third cable connected to one of said trolleys to move said trolleys along said first cable,
   f. a fourth cable fixedly connected to said first upright member and extending through said first trolley in guided relation and through said second trolley,
      1. a pair of sheaves within said second trolley to receive said fourth cable thereover,
      2. a sheave on said second upright member to receive said fourth cable thereover,
      3. a sheave pulley mounted on said fourth cable between said pair of sheaves in said second trolley,
   g. a fifth cable fixedly connected to said first upright member and extending through said first trolley and through said second trolley in guided relation,
      1. a pair of sheaves within said first trolley to receive said fifth cable thereover,
      2. a sheave on said second upright member to receive said fifth cable thereover,
      3. a sheave pulley mounted on said fifth cable between said pair of sheaves in said first trolley,
   h. a winching mechanism,
      1. at least some of said cables being connected to winches of said winching mechanism,
   i. a elongated, open top pipe carrier,
      1. connection means near each end of said elongated pipe carrier to detachably connect said pipe carrier to said respective pulleys on said fourth and fifth cables for raising and lowering said sheave pulleys,
   j. power means connected in driving relation with said winches to wind cable onto said winches and to unwind cable therefrom.

2. A device for picking up pipe from a rack and conveying the pipe to a derrick platform and for conveying pipe from the derrick platform to a pipe rack; as defined in claim 1 wherein
   a. the winches of said winching mechanism are connected to said fourth and fifth cables and are adapted to selectively raise or lower said pulleys on said respective cables that are connected to said elongated, open top pipe carrier so as to raise, lower or angulate the pipe carrier to any selected angle.

3. A device for picking up pipe from a rack and conveying the pipe to a derrick platform, and for conveying the pipe from the derrick platform to a pipe rack, as defined in claim 1; wherein
   a. said elongated pipe carrier is an open top carrier which is reversible so pipe may be loaded laterally thereonto or discharged laterally therefrom from either side thereof, b. a detachable end plate adapted to fit into either end of said elongated, open top carrier, and c. fastening means to selectively fasten said end plate in either end of said pipe carrier.

4. A device for picking up pipe from a rack and conveying the pipe to a derrick platform, and for conveying the pipe from the derrick platform to a pipe rack, as defined in claim 3; wherein a. said elongated, open top pipe carrier is semi-cylindrical in shape.

5. A device for picking up pipe from a rack and conveying the pipe to a derrick platform, and for conveying the pipe from the derrick platform to a pipe rack ad defined in claim 3; wherein a. a trackway within said elongated, open top pipe carrier, b. a wheeled car is mounted on said trackway for longitudinal movement therealong.

6. A device for picking up pipe from a rack and conveying the pipe to a derrick platform, and for conveying the pipe from the derrick platform to a pipe rack, as defined in claim 5; wherein a. one end of said elongated, open top pipe carrier is magnetic, and b. said wheeled car having an end thereof magnetically held to said end member until a predetermined pressure is applied to said wheeled car.

7. A device for picking up pipe from a rack and conveying the pipe to a derrick platform, and for conveying the pipe from the derrick platform to a pipe rack, as defined in claim 3; wherein a. said elongated, open top pipe carrier is formed of a plurality of longitudinal sections, b. fastening means joining said longitudinal sections in end to end, aligned relation.

8. A device for picking up pipe from a rack and conveying the pipe to a derrick platform, and for conveying the pipe from the derrick platform to a pipe rack, as defined in claim 2; wherein a. each said trolley has a notch formed in the lower side thereof, 1. each said sheave pulley adapted to complementally fit in said respective notches when said sheave pulleys are moved into contact relation with the lower side of said respective trolleys so said pipe carrier will be substantially parallel to said first cable for movement with said trolleys along said first cable.

9. A device for picking up pipe from a rack and conveying the pipe to a derrick platform, and for conveying pipe from the derrick platform to a pipe rack, as defined in claim 1; wherein a. said first upright member is mounted on the derrick platform, b. mounting means, at a lower elevation than said derrick platform, c. said second upright member mounted on said mounting means intermediate said winching mechanism and said first upright member, so when said cables extend between said first upright member and said second upright member they will be angulated so said trolleys will move downwardly, along said first cable, from the derrick platform, when not restrained, d. a sheave pulley on said first upright member, e. a sheave pulley on said second upright member, 1. said third cable, which is connected to one of said trolleys, being adapted to pass around the pulley on said first upright member and over the pulley on said second upright member and being connected to one of said winches of said winching mechanism so as to move said trolleys and said elongated, open top pipe carrier along said first cable.

10. A device for picking up pipe from a rack and conveying the pipe to a derrick platform, and for conveying the pipe from the derrick platform to a pipe rack, as defined in claim 9; wherein a. the platform of the derrick is adapted to have a "mouse hole" casing extending up therethrough, 1. said first upright member being mounted in the "mouse hole" casing and extending upwardly therefrom, 2. said first, fourth and fifth cables adapted to be fixedly secured to said first upright member, 3. a sheave pulley mounted on said first upright member and said third cable being fitted within said sheave pulley for movement of said third cable therein for moving said trolleys along said first cable.

11. A device for picking up pipe from a rack and conveying the pipe to a derrick platform, and for conveying the pipe from the derrick platform to a pipe rack, as defined in claim 1; wherein a. said winching mechanism is mounted on a vehicle, b. said second upright member is mounted on said vehicle, c. said first, third, fourth and fifth cables wind onto respective winches of said winching mechanism, and d. said trolleys and said first upright member adapted to be fitted onto the vehicle for movement over the terrain therewith as a composite unit.

12. In combination a device for conveying pipe in an elongated, open top pipe carrier, supported by trolleys, along a first cable into a position to discharge pipe laterally from the pipe carrier onto a pipe rack, which device comprises;

a. a base, b. longitudinally spaced apart support members, one mounted on said base near each end thereof, c. a pair of substantially horizontal, spaced apart members mounted on the base for a portion of the width thereof, d. a sloping member mounted adjacent each said horizontal member in off-set, transverse relation with respect to each said horizontal member, e. an upright, angulated member detachably secured to each said horizontal member and engageable with said elongated, open top pipe carrier to direct said pipe carrier downward therealong, and f. an abutment at the base of said upright angulated member to engage said elongated, open top pipe carrier to turn said pipe carrier about the longitudinal axis thereof at least 90° to discharge pipe laterally therefrom onto said sloping member.

13. The combination ad defined in claim 12; wherein a. a hook-like member is fixedly secured to the elongated, open top pipe carrier, near each end thereof to engage said upright, angulated members to rotate said pipe carrier to discharge pipe laterally therefrom onto the sloping member.

14. In combination, a device for loading pipe into an elongated, open top carrier for conveying the carrier along a first cable, which pipe carrier is supported by trolleys to convey the pipe from a pipe rack to a derrick platform, which device comprises;
   a. a base,
   b. a pair of substantially horizontal, spaced apart transverse members mounted on said base, for a portion of the width thereof,
   c. a second pair of spaced apart, transverse members mounted on said base, one near each end thereof, which members slope outwardly from each said first transverse member for a portion of the width of said base,
   d. an upright, angulated member detachably secured to each said sloping member at a lower elevation than said pair of of horizontal members,
   e. an abutment associated with each said upright angulated member near the lower end thereof to engage with said elongated, open top pipe carrier to position an edge of said pipe carrier in a horizontal plane at a lower elevation than said pair of horizontal members,
   f. an upright, angulated, fluid actuated cylinder-plunger frame connected to the outer end of each said horizontal member,
      1. a fluid actuated cylinder-plunger in each said angulated frame,
      2. an outwardly extending projection on each said plunger, each which projection is adapted to move with said respective plunger, from a position below the normal height of the pipe support rack to a position at least flush with said horizontal members, so when a length of pipe is rolled from the pipe rack onto the outwardly projecting members, the pipe may be elevated, by said fluid actuated cylinder-plungers, to said horizontal members, and
      3. the pipe being discharged from said outwardly extended, angulated projections on said plungers onto said elongated open top pqpe carrier, to be conveyed to the derrick platform.

15. A combination as defined in claim 14; wherein
   a. said fluid actuated cylinder-plungers in said frames are hydraulically actuated cylinder-plunger assemblies.

* * * * *